US006937489B2

(12) United States Patent
Hsieh et al.

(10) Patent No.: US 6,937,489 B2
(45) Date of Patent: Aug. 30, 2005

(54) SIGMA-DELTA MODULATION INVERTER WITH PROGRAMMABLE WAVEFORM OUTPUT

(75) Inventors: Guan-Chyun Hsieh, Taipei (TW); Hung-Liang Chen, Taipei (TW); Jui-Chih Cheng, Hualien (TW)

(73) Assignee: National Taiwan University of Science and Technology, Taipei (TW)

( * ) Notice: Subject to any disclaimer, the term of this patent is extended or adjusted under 35 U.S.C. 154(b) by 8 days.

(21) Appl. No.: 10/681,654

(22) Filed: Oct. 7, 2003

(65) Prior Publication Data

US 2005/0073868 A1 Apr. 7, 2005

(51) Int. Cl.[7] .............................................. H02M 7/42
(52) U.S. Cl. ....................................................... 363/98
(58) Field of Search ............................. 363/40, 41, 97, 363/98; 341/143, 155

(56) References Cited

U.S. PATENT DOCUMENTS 5,099,410 A * 3/1992 Divan ........................ 363/98

6,717,392 B2 * 4/2004 Pearson ................... 324/76.11

* cited by examiner

Primary Examiner—Gary L Laxton
(74) Attorney, Agent, or Firm—Volpe and Koenig, P.C.

(57) ABSTRACT

An inverter for converting a DC input voltage into an AC output voltage using the sigma-delta modulation (SDM) is provided which includes: a SDM controller for producing a modulated output voltage signal according to a reference voltage signal, a driving circuit electrically connected to the SDM controller for producing a driving signal according to the modulated output voltage signal, and a power inversion stage circuit electrically connected to the driving circuit for producing the AC output voltage according to the driving signal. A controller for producing a modulated output voltage signal according to a reference voltage signal is also provided which includes: an integrator circuit, a sample-and-hold circuit electrically connected to the integrator circuit, and a quantizer circuit electrically connected to the sample-and-hold circuit and electrically connected to an input terminal of the integrator circuit through an output terminal thereof.

27 Claims, 17 Drawing Sheets

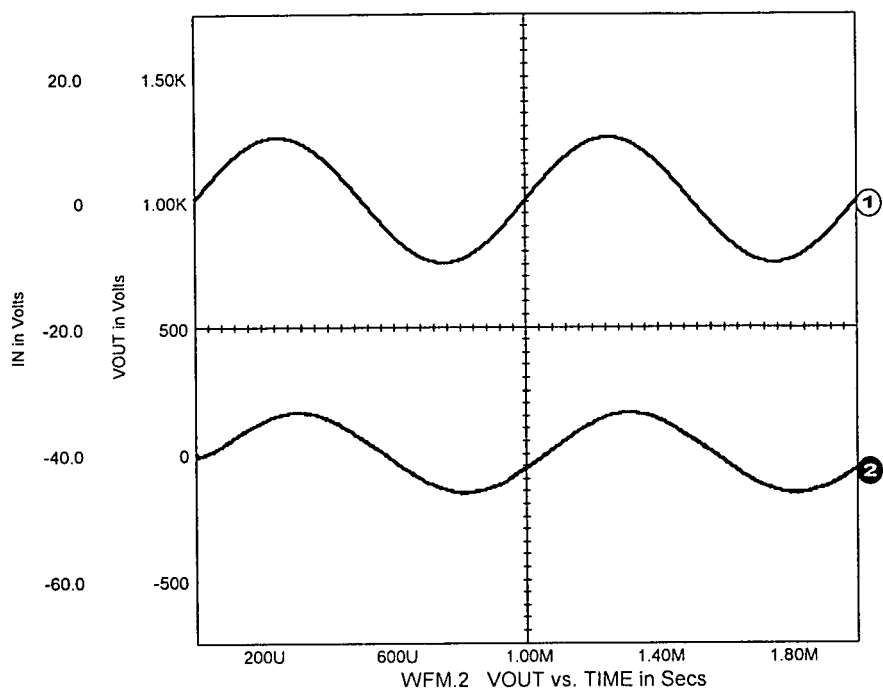
FIG. 6 (a1)
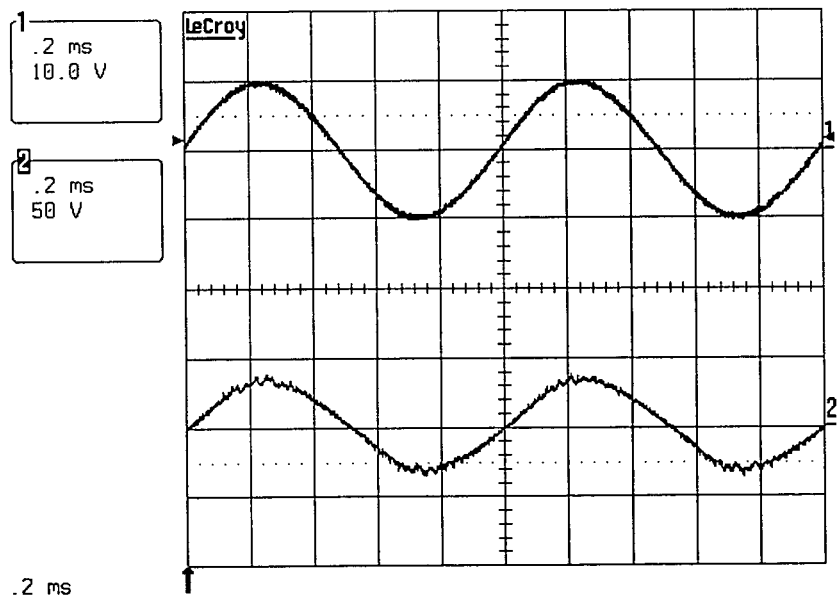
FIG. 6 (a2)

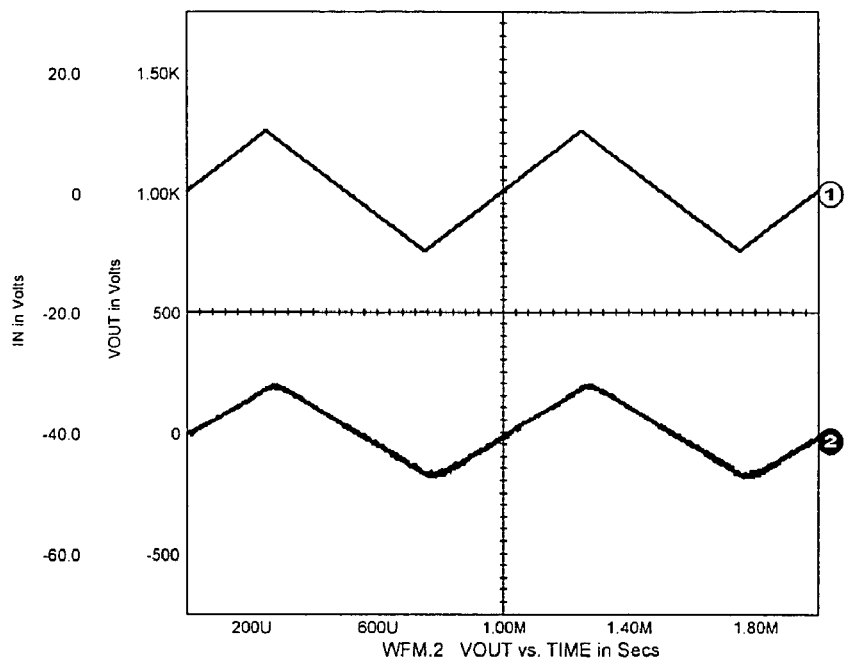
FIG. 6 (b1)
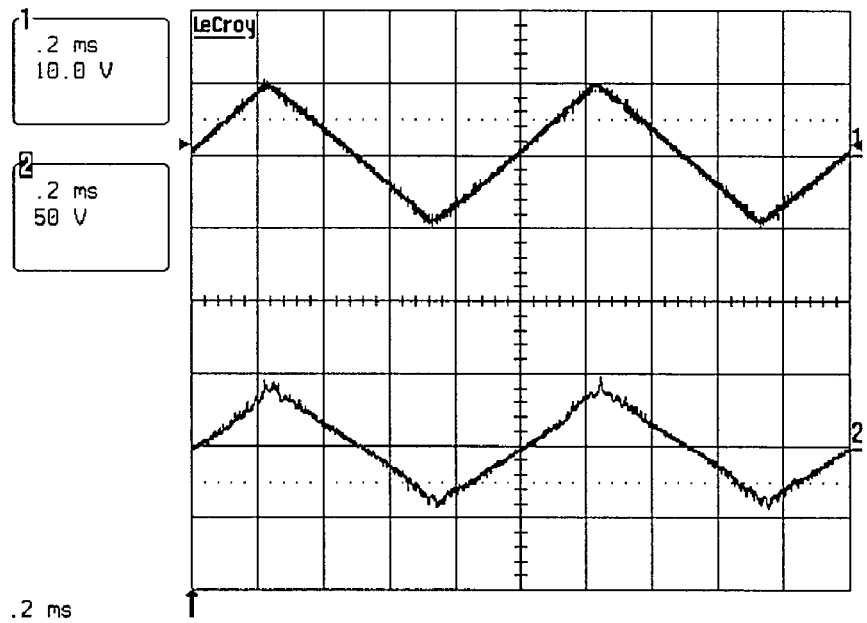
FIG. 6 (b2)

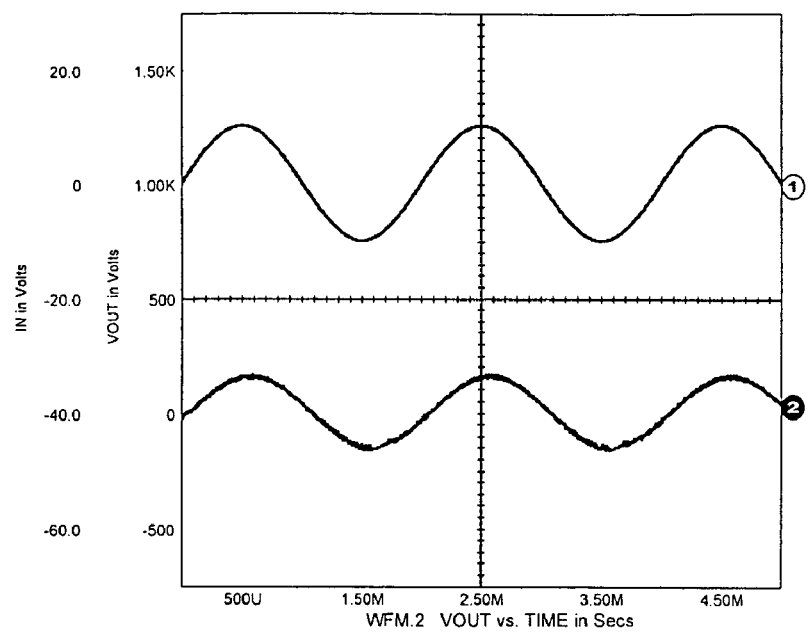
FIG. 7 (a1)
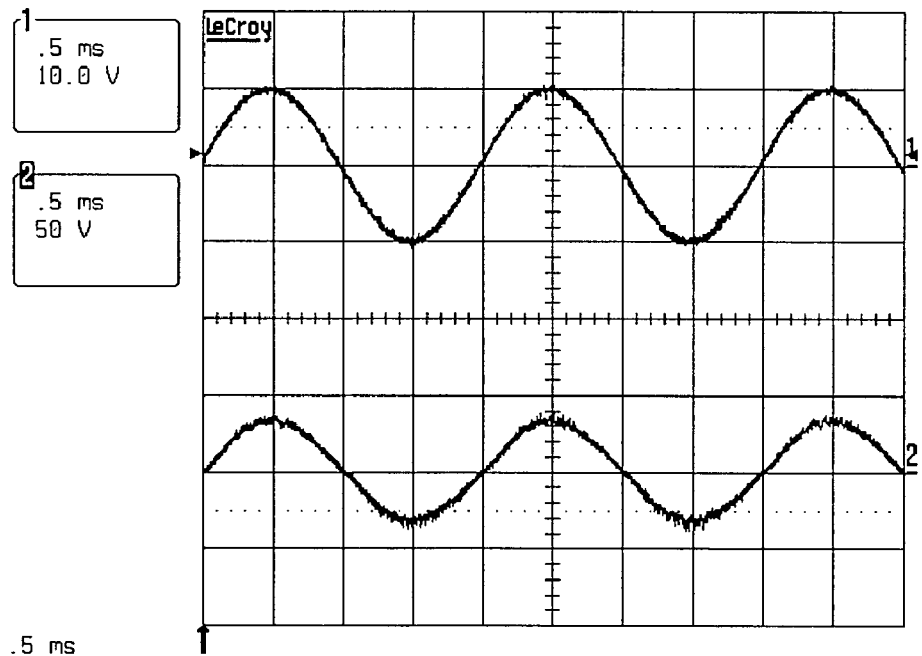
FIG. 7 (a2)

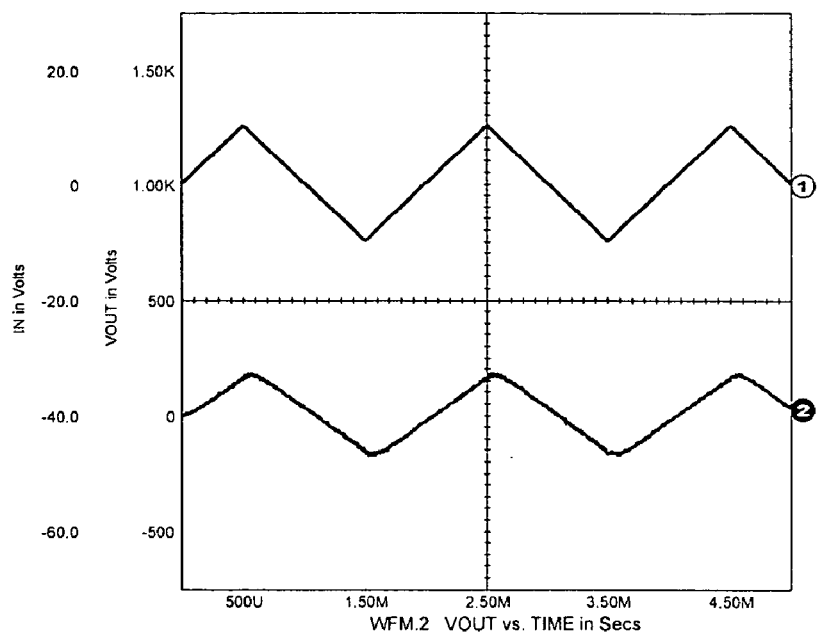
FIG. 7 (b1)
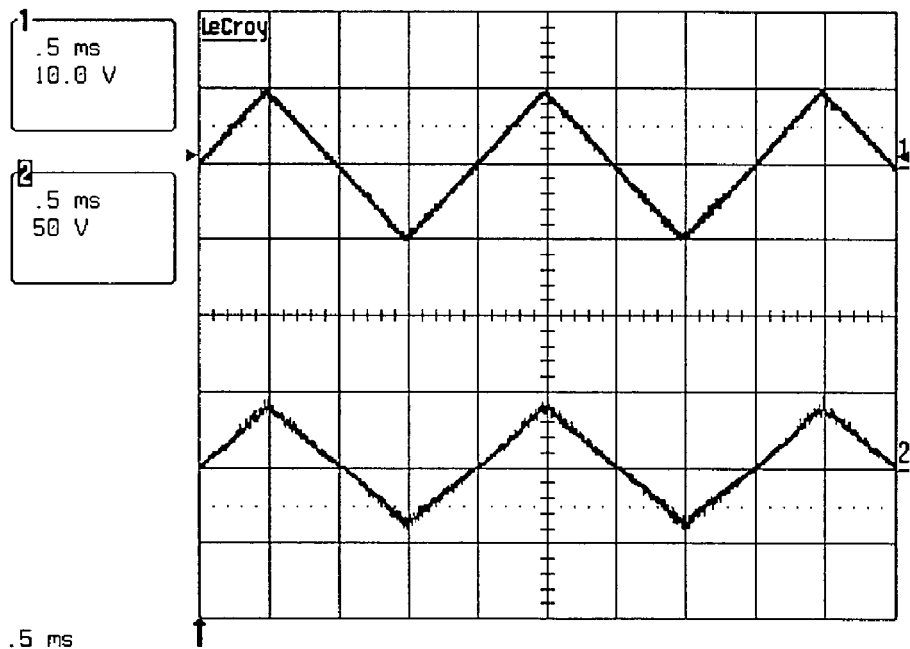
FIG. 7 (b2)

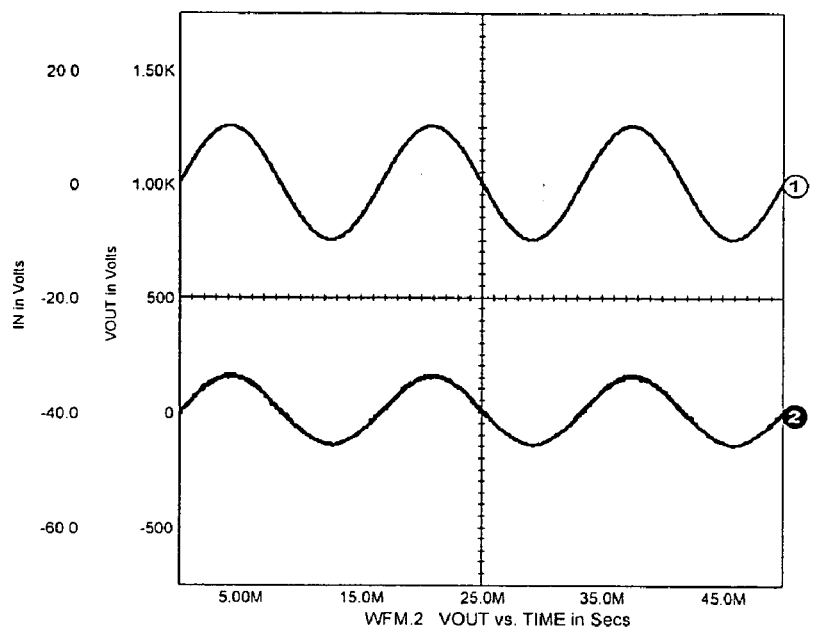
FIG. 8 (a1)
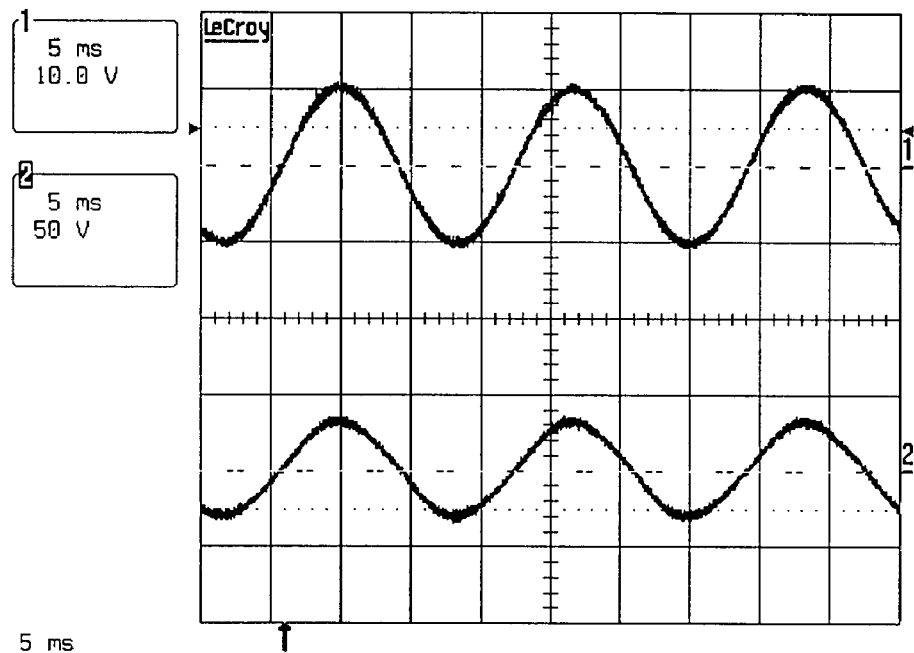
FIG. 8 (a2)

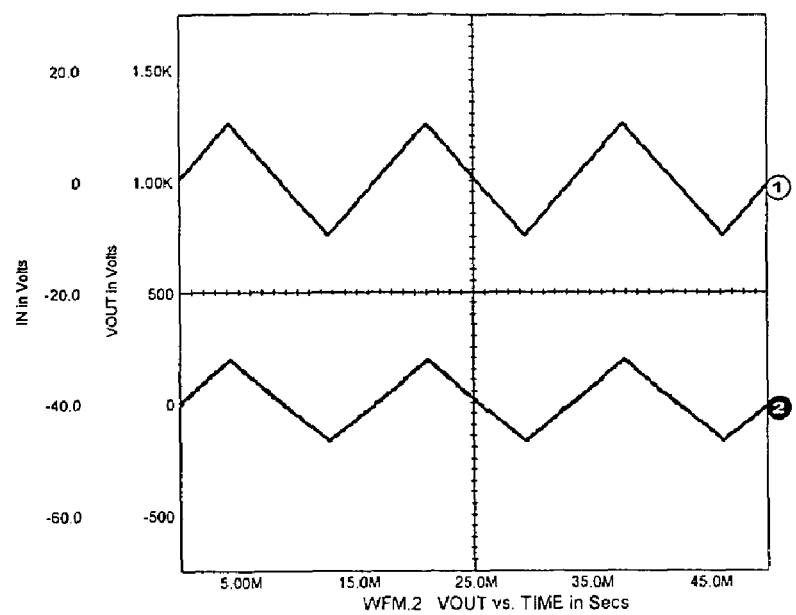
FIG. 8 (b1)
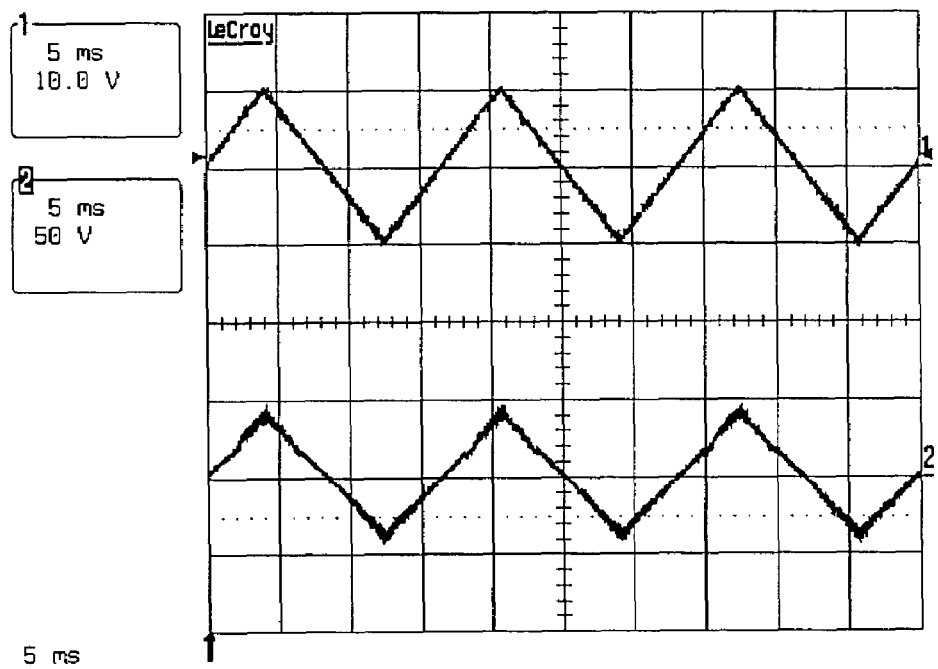
FIG. 8 (b2)

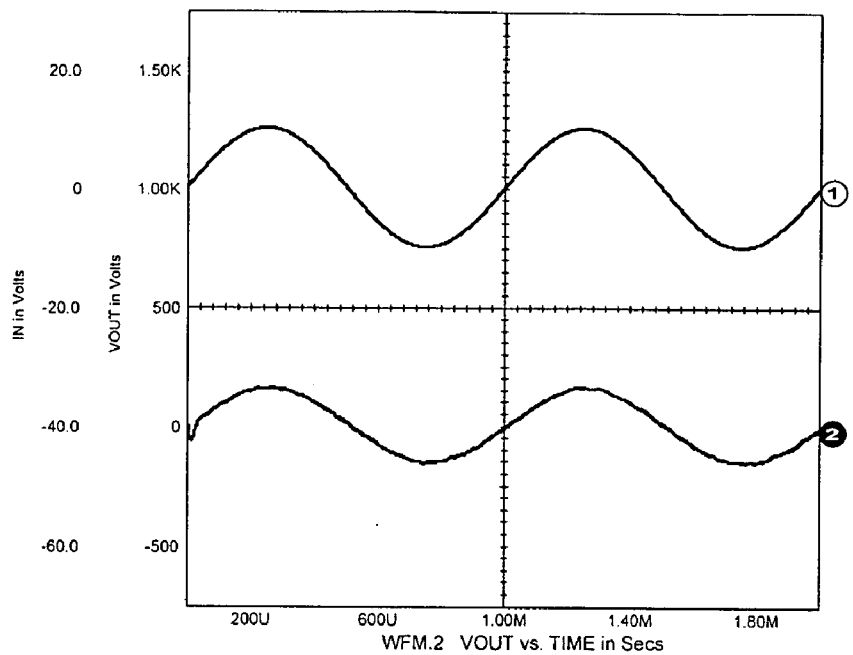
FIG. 9 (a1)
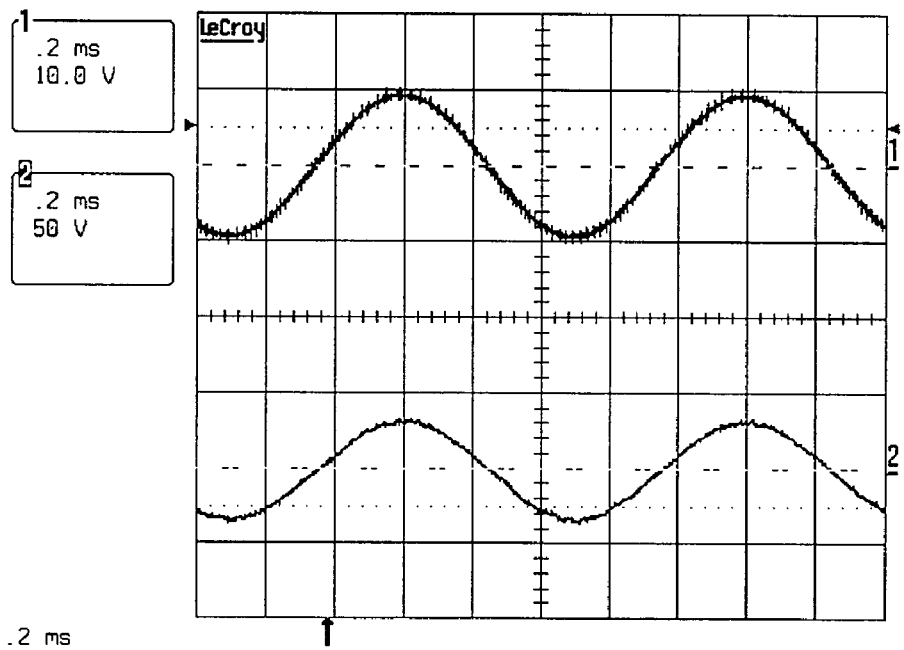
FIG. 9 (a2)

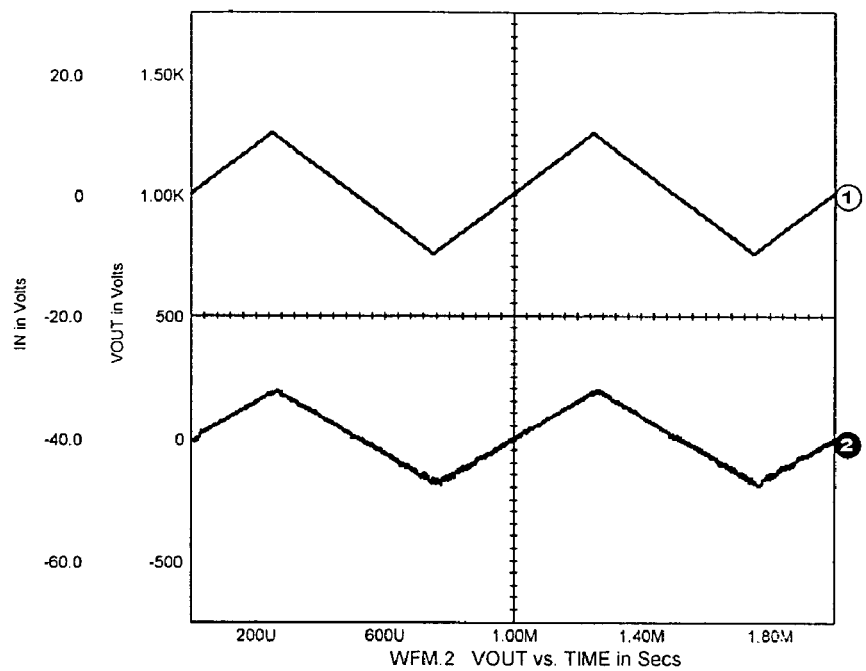
FIG. 9 (b1)
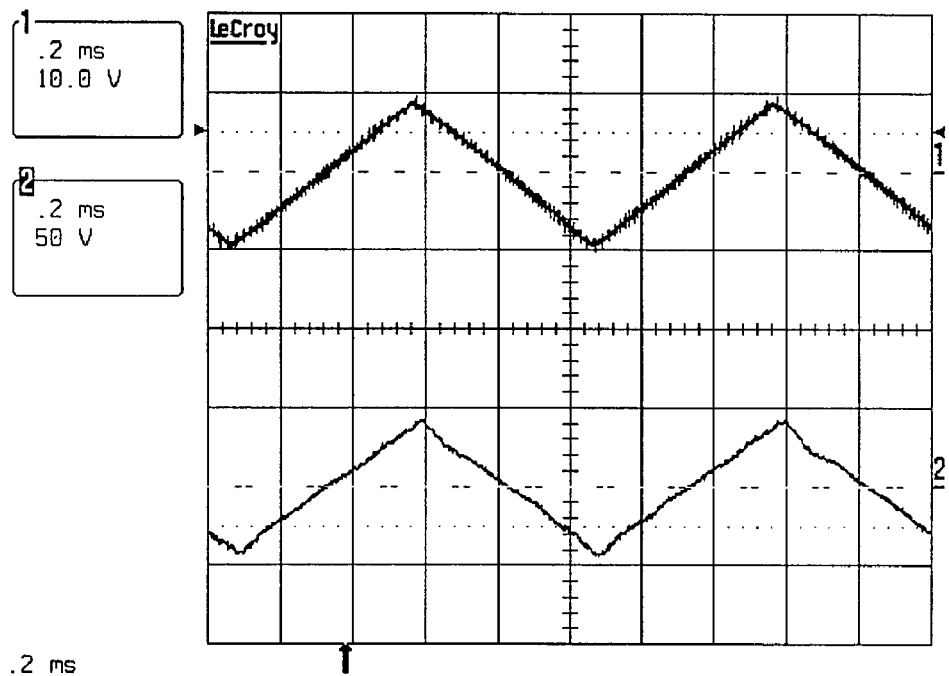
FIG. 9 (b2)

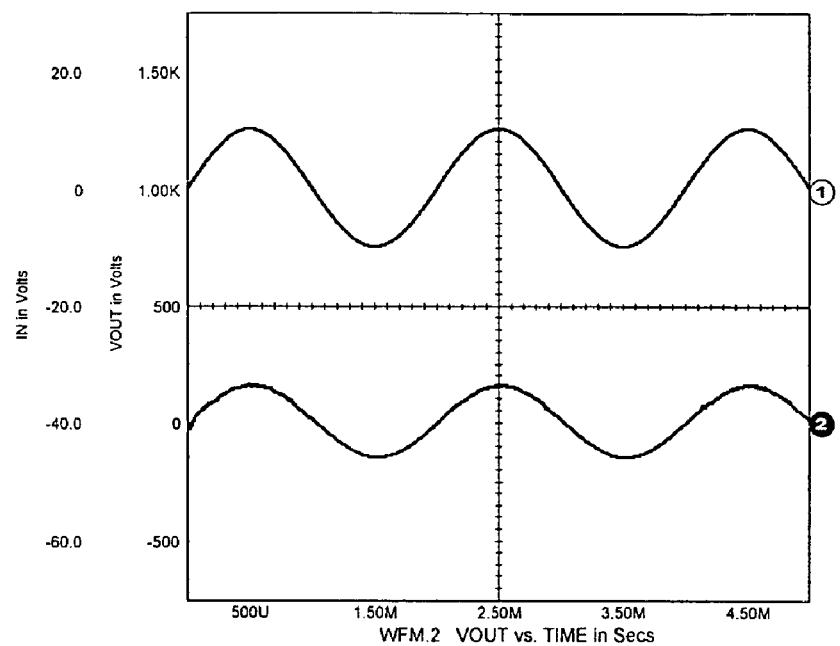
FIG.10 (a1)
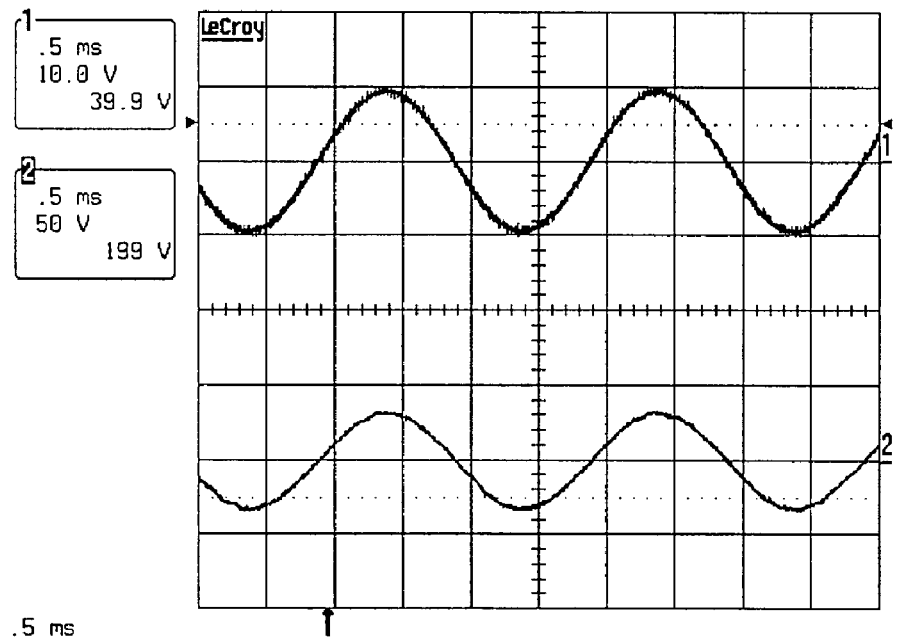
FIG.10 (a2)

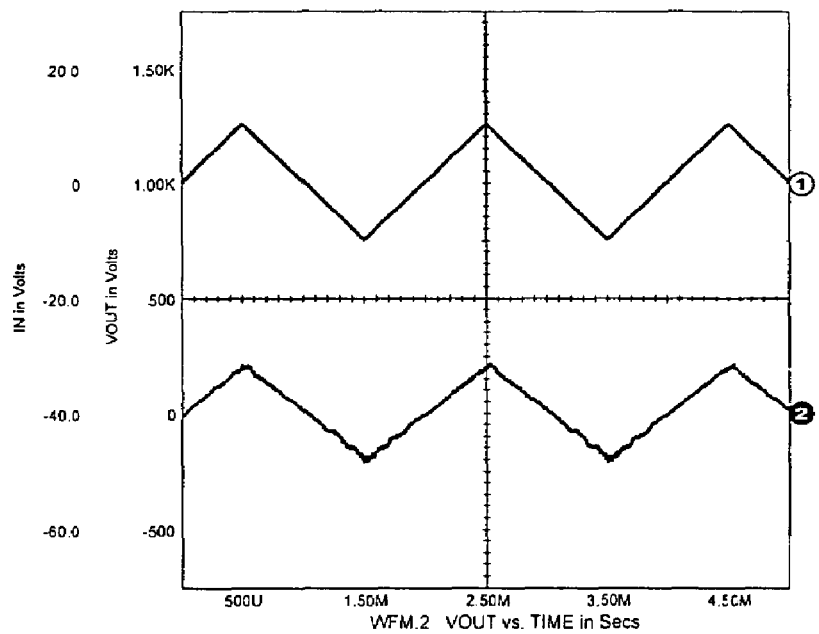
FIG.10 (b1)
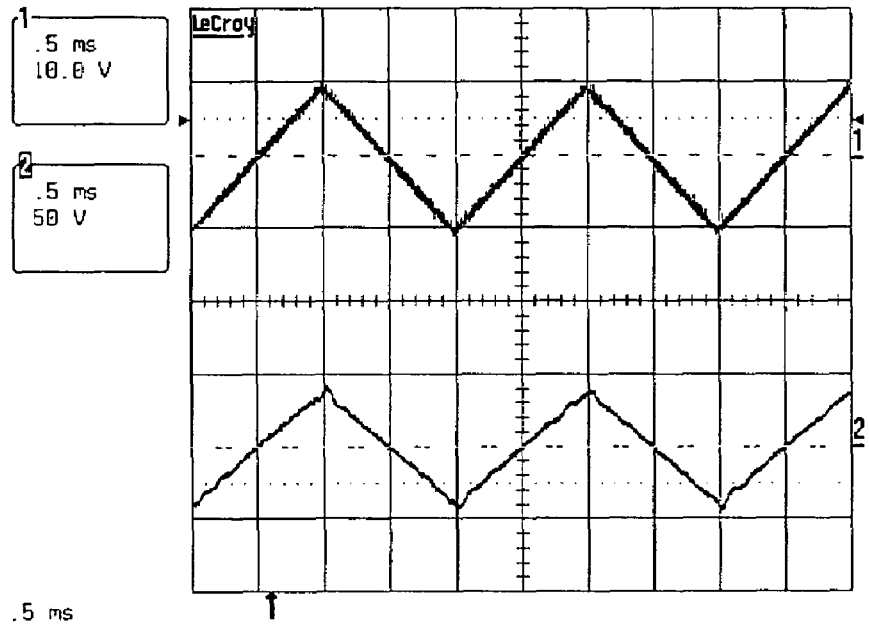
FIG.10 (b2)

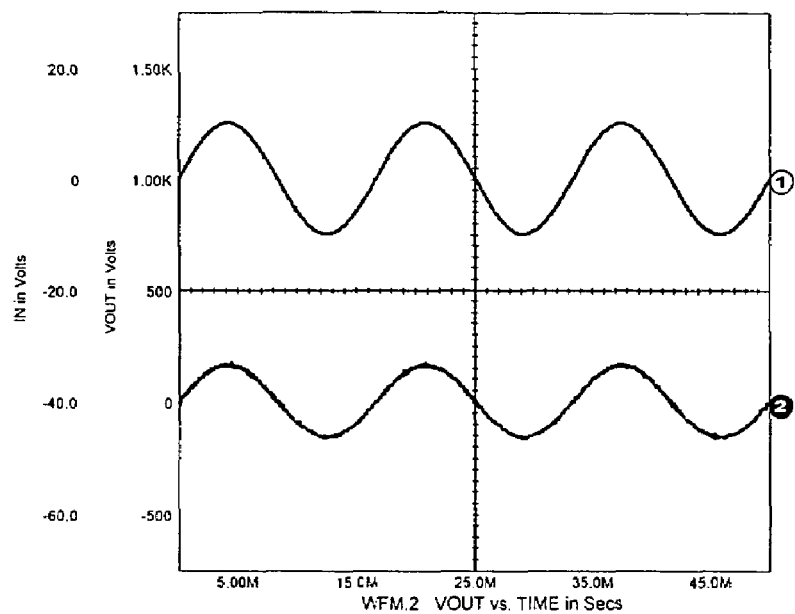
FIG.11 (a1)
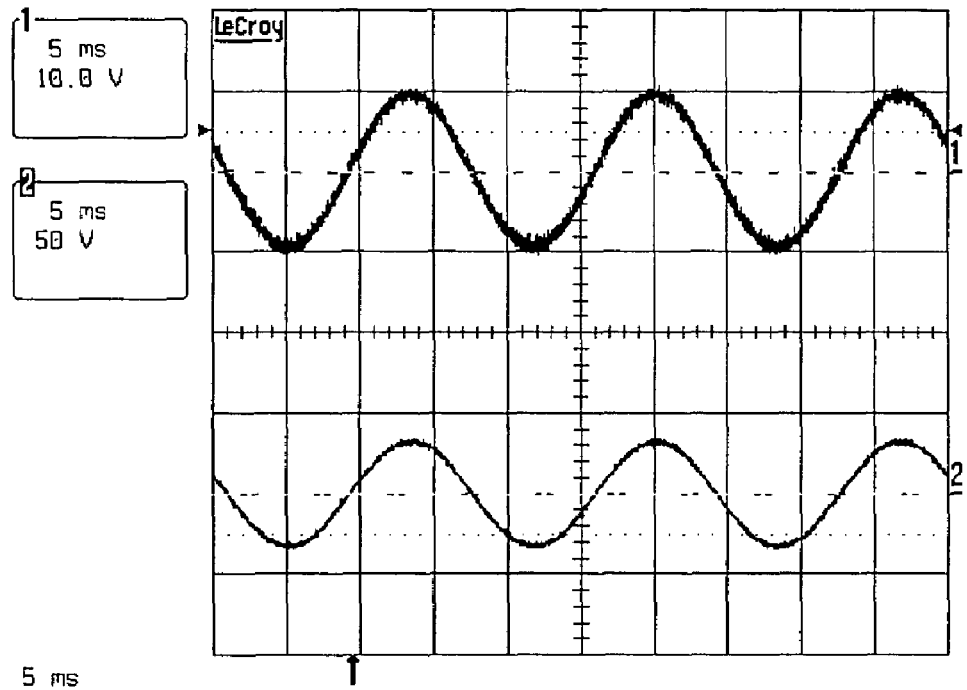
FIG.11 (a2)

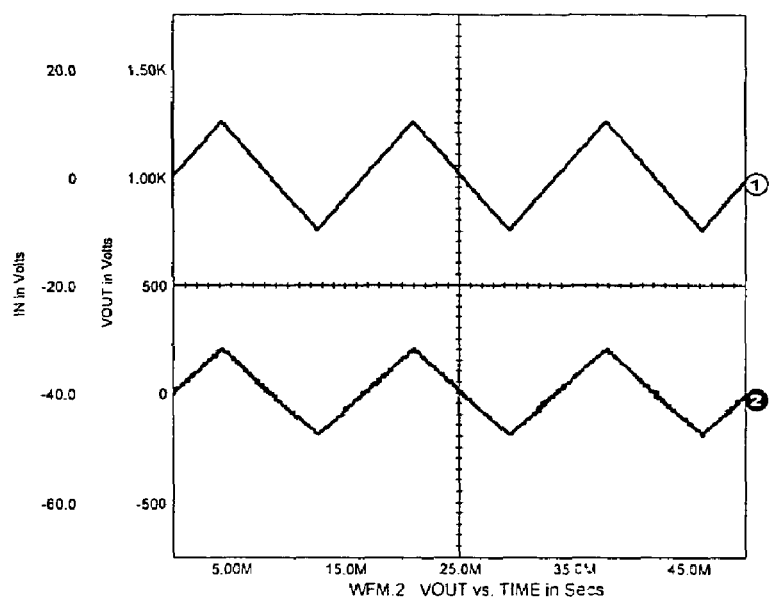
FIG.11 (b1)
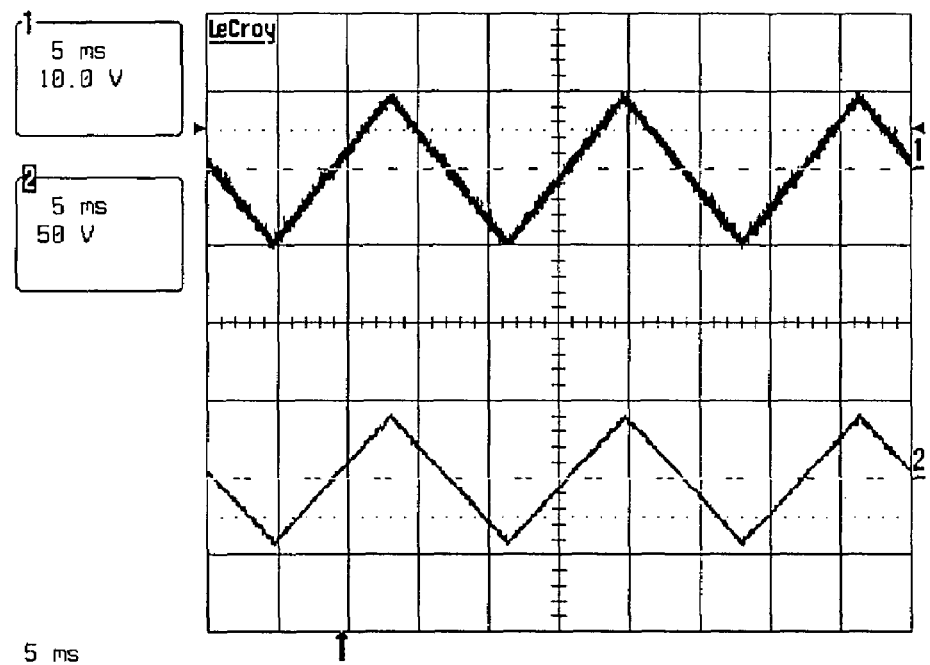
FIG.11 (b2)

SIGMA-DELTA MODULATION INVERTER WITH PROGRAMMABLE WAVEFORM OUTPUT

FIELD OF THE INVENTION

The present invention relates to an inverter for converting a DC input voltage into an AC output voltage using the sigma-delta modulation (SDM). More specifically, this invention relates to a sigma-delta modulation (SDM) DC/AC inverter with programmable waveform output.

BACKGROUND OF THE INVENTION

The DC/AC inverter has been the major essentials for implementing the uninterrupted power supply (UPS), AC power sources, and any kind of the AC motor drivers etc. Due to the rapid progress in the development of the power electronics, many approaches for realizing a compact inverter with high efficiency have been proposed.

In year 1988, the phase-controlled DC/AC Inverter has been proposed for using the differences of phase angles between different switches to modulate the output voltage. The above-mentioned phase-controlled DC/AC Inverter has relatively a simpler configuration, a higher power efficiency, a minimized volume of the isolation transformer due to the high-frequency switching so as to be beneficial to the manufacturing costs and the space limitations. However, the total harmonic distortions (THD) of the output voltages of this kind of inverters are relatively larger.

Nowadays, the widely used control strategies for realizing a DC/AC inverter is the pulse width modulation (PWM) for using an input reference signal to compare with a triangular waveform so as to produce a width-modulated pulse to fulfill the object of controlling output voltage waveforms. In general, a voltage source inverter will have an output voltage of a rectangular waveform with a higher harmonic so as to decrease the power efficiency, therefore, the PWM inverter circuits can be employed to solve the problems regarding the voltage modulations and the waveforms distortions. The PWM is mainly focused on the control of the on/off of the power switches of the inverter circuits so as to get a series of pulses with equivalent-amplitudes but with nonequivalent-widths thus the widths of the pulses will form a sinusoidal distribution according to the Fourier series and the combinations of the pulses will form an equivalent sinusoidal voltage waveforms so as to engage in the modulation of each pulse in accordance with certain rules to change the magnitudes of the output voltages as well as the frequencies.

Due to the triangular waves are employed to compare with the reference signals in the above-mentioned PWM, it is not easy to decrease the harmonic distortions of AC outputs, thus other circuits are employed so as to gain the better characteristics of the PWM controlling method yet the complexity of the circuit configuration is increased accordingly.

Furthermore, a DC/AC inverter with outputs of any kind of waveforms might be the demands in the future so as to cope with the progress of the advanced technologies. Actually, a DC/AC inverter with the programmable output waveforms and frequencies could not be realized by the previously proposed PWM strategies.

Keep the drawbacks of the prior arts in mind, and employ experiments and research full-heartily and persistently, the sigma-delta modulation inverter with programmable waveform output is finally conceived by the applicants.

SUMMARY OF THE INVENTION

It is therefore an object of the present invention to provide a sigma-delta modulation (SDM) DC/AC inverter with programmable waveform output for simplifying the circuit configuration, decreasing the total harmonic distortion (THD), and increasing the power efficiency.

According to the aspect of the present invention, the inverter for converting a DC input voltage into an AC output voltage using the sigma-delta modulation includes: a sigma-delta modulation (SDM) controller for producing a modulated output voltage signal according to a reference voltage signal, a driving circuit electrically connected to the SDM controller for producing a driving signal according to the modulated output voltage signal, and a power inversion stage circuit electrically connected to the driving circuit for producing the AC output voltage according to the driving signal.

Preferably, the SDM controller includes: an integrator circuit for producing an integrator output signal according to a difference between the reference voltage signal and the modulated output voltage signal, a sample-and-hold circuit electrically connected to the integrator circuit for sampling and holding the integrator output signal, and a quantizer circuit electrically connected to the sample-and-hold circuit and electrically connected to an input terminal of the integrator circuit through an output terminal thereof for quantizing the integrator output signal and producing the modulated output voltage signal.

Preferably, the integrator circuit is an integrator.

Preferably, the integrator is a differential integrator.

Preferably, the sample-and-hold circuit is a sample-and-hold device and is controlled by an external sampling signal.

Preferably, the quantizer circuit is a two-level quantizer.

Preferably, the two-level quantizer is a two-level comparator.

Preferably, the modulated output voltage signal is a pulse train.

Preferably, the reference voltage signal is input from an external signal generator.

Preferably, the driving circuit is a high/low side driver.

Preferably, the power inversion stage circuit includes: a power stage circuit electrically connected to the driving circuit for producing a AC power signal according to the driving signal and the DC input voltage, and a filter circuit electrically connected to the power stage circuit for producing the AC output voltage according to the AC power signal.

Preferably, the power stage circuit is in a full-bridge configuration.

Preferably, the full-bridge configuration is a H-diagonal structure having four power switches.

Preferably, each of the four power switches is a MOSFET.

Preferably, the filter circuit is a low-pass filter.

Preferably, the filter circuit comprises an inductor and a capacitor in series.

According to another aspect of the present invention, a controller for producing a modulated output voltage signal according to a reference voltage signal includes: an integrator circuit for producing an integrator output signal according to a difference between the reference voltage signal and the modulated output voltage signal, a sample-and-hold circuit electrically connected to the integrator circuit for sampling and holding the integrator output signal, and a quantizer circuit electrically connected to the sample-and-hold circuit and electrically connected to an input terminal of the integrator circuit through an output terminal thereof for quantizing the integrator output signal and producing the modulated output voltage signal.

Preferably, the integrator circuit is an integrator.

Preferably, the integrator is a differential integrator.

Preferably, the sample-and-hold circuit is a sample-and-hold device and is controlled by an external sampling signal.

Preferably, the quantizer circuit is a two-level quantizer.

Preferably, the two-level quantizer is a two-level comparator.

Preferably, the modulated output voltage signal is a pulse train.

Preferably, the reference voltage signal is input from an external signal generator.

Preferably, the controller is a SDM controller.

The present invention may best be understood through the following descriptions with reference to the accompanying drawings, in which:

BRIEF DESCRIPTION OF THE DRAWINGS

FIGS. 6 (a1) and (a2) are the schematic diagrams showing the simulated and measured output waveforms of the present invention respectively when the output power=1 kVA, the desired output voltage Vout=110 Vrms, the input waveforms are sinusoidal waveforms, and the frequency of the input waveforms=1 kHz;

FIGS. 6 (b1) and (b2) are the schematic diagrams showing the simulated and measured output waveforms of the present invention respectively when the output power=1 kVA, the desired output voltage Vout=110 Vrms, the input waveforms are triangular waveforms, and the frequency of the input waveforms=1 kHz;

FIGS. 7 (a1) and (a2) are the schematic diagrams showing the simulated and measured output waveforms of the present invention respectively when the output power=1 kVA, the desired output voltage Vout=110 Vrms, the input waveforms are sinusoidal waveforms, and the frequency of the input waveforms=500 Hz;

FIGS. 7 (b1) and (b2) are the schematic diagrams showing the simulated and measured output waveforms of the present invention respectively when the output power=1 kVA, the desired output voltage Vout=110 Vrms, the input waveforms are triangular waveforms, and the frequency of the input waveforms=500 Hz;

FIGS. 8 (a1) and (a2) are the schematic diagrams showing the simulated and measured output waveforms of the present invention respectively when the output power=1 kVA, the desired output voltage Vout=110 Vrms, the input waveforms are sinusoidal waveforms, and the frequency of the input waveforms=60 Hz;

FIGS. 8 (b1) and (b2) are the schematic diagrams showing the simulated and measured output waveforms of the present invention respectively when the output power=1 kVA, the desired output voltage Vout=110 Vrms, the input waveforms are triangular waveforms, and the frequency of the input waveforms=60 Hz;

FIGS. 9 (a1) and (a2) are the schematic diagrams showing the simulated and measured output waveforms of the present invention respectively when the output power=200 VA, the desired output voltage Vout=110 Vrms, the input waveforms are sinusoidal waveforms, and the frequency of the input waveforms=1 kHz;

FIGS. 9 (b1) and (b2) are the schematic diagrams showing the simulated and measured output waveforms of the present invention respectively when the output power=200 VA, the desired output voltage Vout=110 Vrms, the input waveforms are triangular waveforms, and the frequency of the input waveforms=1 kHz;

FIGS. 10 (a1) and (a2) are the schematic diagrams showing the simulated and measured output waveforms of the present invention respectively when the output power=200 VA, the desired output voltage Vout=110 Vrms, the input waveforms are sinusoidal waveforms, and the frequency of the input waveforms=500 Hz;

FIGS. 10 (b1) and (b2) are the schematic diagrams showing the simulated and measured output waveforms of the present invention respectively when the output power=200 VA, the desired output voltage Vout=110 Vrms, the input waveforms are triangular waveforms, and the frequency of the input waveforms=500 Hz;

FIGS. 11 (a1) and (a2) are the schematic diagrams showing the simulated and measured output waveforms of the present invention respectively when the output power=200 VA, the desired output voltage Vout=110 Vrms, the input waveforms are sinusoidal waveforms, and the frequency of the input waveforms=60 Hz; and FIGS. 11 (b1) and (b2) are the schematic diagrams showing the simulated and measured output waveforms of the present invention respectively when the output power=200 VA, the desired output voltage Vout=110 Vrms, the input waveforms are triangular waveforms, and the frequency of the input waveforms=60 Hz.

DETAILED DESCRIPTION OF THE PREFERRED EMBODIMENT

Figure 1:
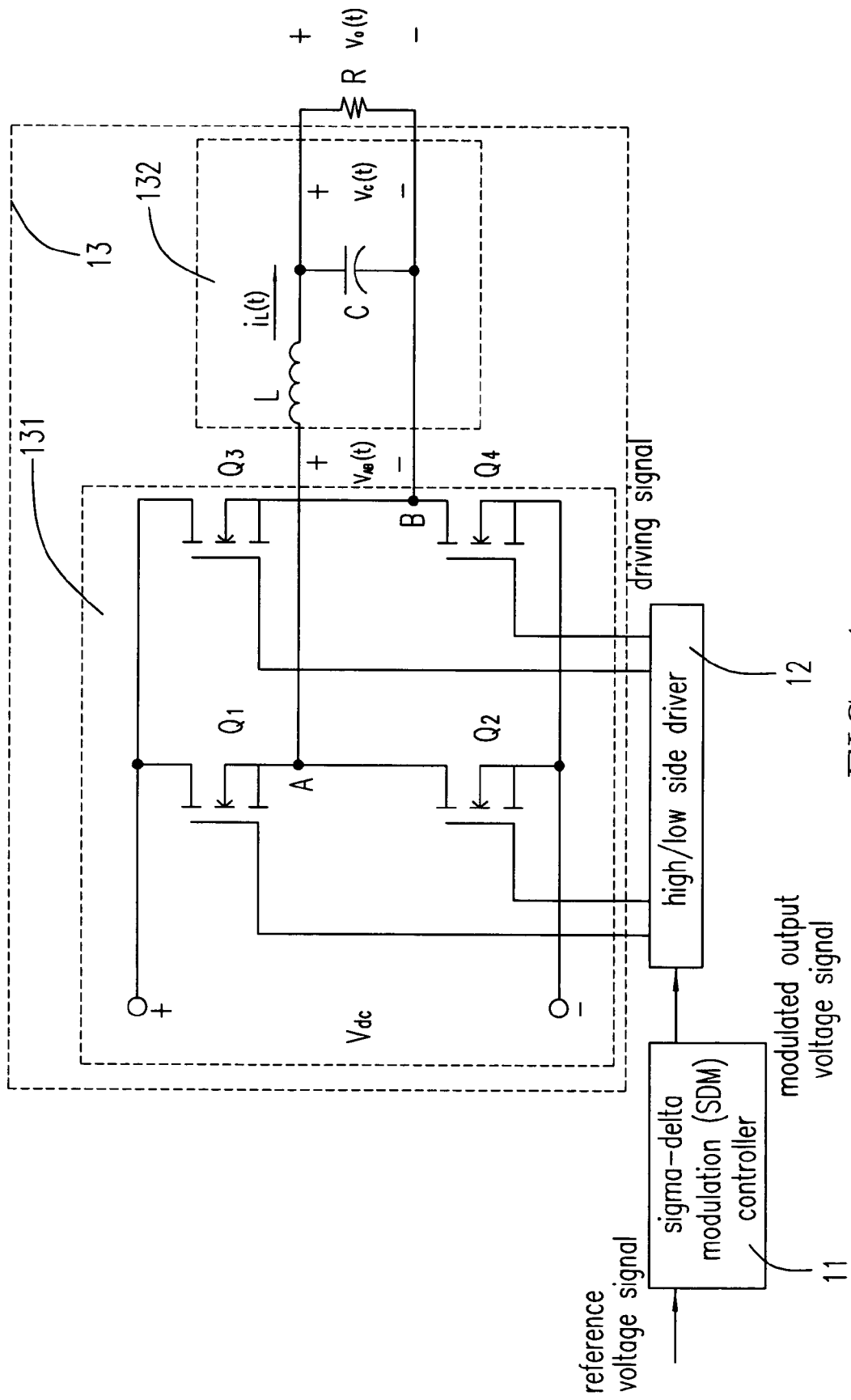
FIG. 1 is the block diagram of the first preferred embodiment of the SDM DC/AC inverter of the present invention.

Please refer to FIG. 1, it is the block diagram of the first preferred embodiment of the SDM DC/AC inverter of the present invention including a SDM controller 11, a high/low side driver 12, and a power inversion stage circuit 13 having a power stage circuit 131 and a filter circuit 132.

The SDM controller 11 is employed for producing a modulated output voltage signal according to the reference voltage signal. The high/low side driver 12 is electrically connected to the SDM controller 11 for producing a plurality of driving signals according to the modulated output voltage signal. The power inversion stage circuit 13 is electrically connected to the high/low side driver 12 for producing a AC output voltage $V_o(t)$ according to the controlling of those driving signals and the DC input voltage $V_{dc}(t)$.

In the power inversion stage circuit 13, the power stage circuit 131 is employed for producing the power AC signal $V_{AB}(t)$ according to the driving signals and the DC input voltage $V_{dc}(t)$, and a filter circuit 132 is electrically connected to the power stage circuit for producing power AC output voltage $V_o(t)$ according to the power AC signal $V_{AB}(t)$. The full-bridge configuration is employed by the power stage circuit 13, in which, the switches (Q1, Q4) and (Q2, Q3) are switched in pairs, and the two pairs are in reverse phases so as to offer a higher power output and to minimize the sizes of the elements of output filter using high-frequency switching techniques. At the output stage, a second-order low-pass filter is formed by a L-C configuration to filter the high frequency signal, to modify the output voltage waveforms, and to offer the power source voltage needed by the load R. Since the full-bridge configuration is employed, the modulated output signals of the SDM controller 11 can not be used to drive the four sets of the switches (Q1, Q2, Q3, Q4) of the power stage circuit 131 directly especially for the upper two switches (Q1, Q3) of the left and right arms. Therefore, the high/low side driver 12 is employed in the present invention so as to gain better driving signals.

As for the controlling stage portion, the SDM technique is employed to control the shapes of the output voltages, which is the main feature of the present invention. According to the circuitry in FIG. 1, when the Q1 and Q4 are on and Q2 and Q3 are off, the dynamic equations of the state-space can be expressed as follows:

$$\begin{bmatrix} \frac{di_L(t)}{dt} \\ \frac{dv_c(t)}{dt} \end{bmatrix} = \begin{bmatrix} 0 & -\frac{1}{L} \\ \frac{1}{C} & -\frac{1}{RC} \end{bmatrix} \begin{bmatrix} i_L(t) \\ v_c(t) \end{bmatrix} + \begin{bmatrix} \frac{1}{L} \\ 0 \end{bmatrix} V_{dc} \quad (1)$$

$$v_o(t) = \begin{bmatrix} 0 & 1 \end{bmatrix} \begin{bmatrix} i_L(t) \\ v_c(t) \end{bmatrix} \quad (2)$$

When the Q1 and Q4 are off and Q2 and Q3 are on, the dynamic equations of the state-space can be expressed as follows:

$$\begin{bmatrix} \frac{di_L(t)}{dt} \\ \frac{dv_c(t)}{dt} \end{bmatrix} = \begin{bmatrix} 0 & -\frac{1}{L} \\ \frac{1}{C} & -\frac{1}{RC} \end{bmatrix} \begin{bmatrix} i_L(t) \\ v_c(t) \end{bmatrix} + \begin{bmatrix} -\frac{1}{L} \\ 0 \end{bmatrix} V_{dc} \quad (3)$$

$$v_o(t) = \begin{bmatrix} 0 & 1 \end{bmatrix} \begin{bmatrix} i_L(t) \\ v_c(t) \end{bmatrix} \quad (4)$$

According to the state-space averaging technique, the dynamic equations of the state-space can be modified as follows:

$$\begin{bmatrix} \frac{di_L(t)}{dt} \\ \frac{dv_c(t)}{dt} \end{bmatrix} = \begin{bmatrix} 0 & -\frac{1}{L} \\ \frac{1}{C} & -\frac{1}{RC} \end{bmatrix} \begin{bmatrix} i_L(t) \\ v_c(t) \end{bmatrix} + \begin{bmatrix} \frac{2d-1}{L} \\ 0 \end{bmatrix} V_{dc} \quad (5)$$

$$v_o(t) = \begin{bmatrix} 0 & 1 \end{bmatrix} \begin{bmatrix} i_L(t) \\ v_c(t) \end{bmatrix} \quad (6)$$

Therein, the d is the duty cycle of the Q1 and Q4. If the perturbations are $\tilde{i}_L(t)$, $\tilde{v}_c(t)$, $\tilde{v}_o(t)$, $\tilde{d}(t)$ and $\tilde{v}_{dc}(t)$, they can be expressed as follows:

$$i_L(t) = I_L + \tilde{i}_L(t) \quad (7)$$

$$V_c(t) = V_c + \tilde{v}_c(t) \quad (8)$$

$$V_o(t) = V_o + \tilde{v}_o(t) \quad (9)$$

$$d(t) = D + \tilde{d}(t) \quad (10)$$

$$v_{dc}(t) = V_{dc} + \tilde{v}_{dc}(t) \quad (11)$$

Assume that $\tilde{v}_{dc}(t) = 0$ to simplify the analysis, then we have:

$$v_{dc}(t) = V_{dc} \quad (12)$$

Substitute (7) to (12) into (5) and (6), we get:

$$\begin{bmatrix} \frac{d\tilde{i}_L(t)}{dt} \\ \frac{d\tilde{v}_c(t)}{dt} \end{bmatrix} = \begin{bmatrix} 0 & -\frac{1}{L} \\ \frac{1}{C} & -\frac{1}{RC} \end{bmatrix} \begin{bmatrix} \tilde{i}_L(t) \\ \tilde{v}_c(t) \end{bmatrix} + \begin{bmatrix} \frac{2V_{dc}}{L} \\ 0 \end{bmatrix} \tilde{d}(t) \quad (13)$$

$$\tilde{v}_o(t) = \begin{bmatrix} 0 & 1 \end{bmatrix} \begin{bmatrix} \tilde{i}_L(t) \\ \tilde{v}_c(t) \end{bmatrix} \quad (14)$$

The steady-state equations are as follows:

$$\begin{bmatrix} 0 & -\frac{1}{L} \\ \frac{1}{C} & -\frac{1}{RC} \end{bmatrix} \begin{bmatrix} I_L \\ V_c \end{bmatrix} + \begin{bmatrix} \frac{2D-1}{L} \\ 0 \end{bmatrix} V_{dc} = 0 \quad (15)$$

$$v_o(t) = \begin{bmatrix} 0 & 1 \end{bmatrix} \begin{bmatrix} I_L \\ V_c \end{bmatrix} \quad (16)$$

From (15) and (16), the voltage transfer characteristics under the steady-state can be expressed as follows:

$$\frac{V_o}{V_{dc}} = 2D - 1 \quad (17)$$

By taking the Laplace Transform of (13) and (14), the power stage transfer function can be expressed as follows:

$$G_p(s) \equiv \frac{\tilde{v}_o(s)}{\tilde{d}(s)} = \frac{\frac{2V_{dc}}{LC}}{s^2 + \frac{1}{RC}s + \frac{1}{LC}} \quad (18)$$

Figure 2:
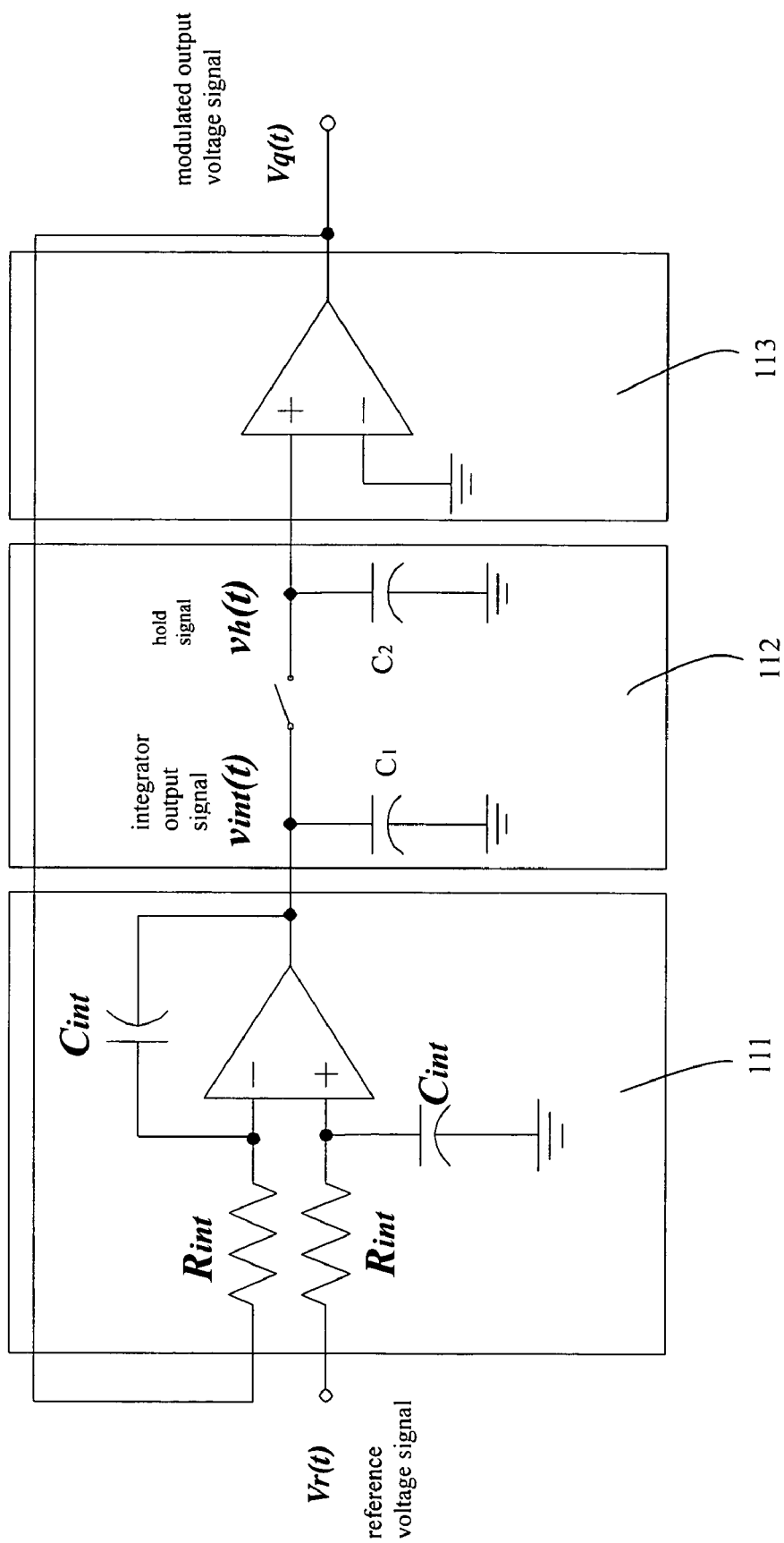
FIG. 2 is the block diagram of the first preferred embodiment of the SDM controller of the present invention.

Please refer to FIG. 2, it is the block diagram of the first preferred embodiment of the SDM controller of the present invention including a integrator circuit 111, a sample-and-hold circuit 112, and a quantizer circuit 113. Therein, the integrator circuit 111 is a differential integrator, the quantizer circuit 113 is a two-level quantizer, and the sample-and-hold circuit 112 is a sample-and-hold device and is controlled by an external sampling signal. The circuitry configuration showing in FIG. 2 is a first-order SDM controller, in which the SDM controller 11 can be referred to as a kind of pulse density modulation (PDM) controller so as to transfer the reference voltage signal into a modulated output voltage signal (a series of pulse signals/a pulse train). The frequency of the pulse signals is decided by the frequency of sampling. If the reference voltage signal has a higher voltage level, the output pulses will have a higher density. If the reference voltage signal has a lower voltage level, the output pulses will have a lower density.

The main principle of the above-mentioned SDM controller 11 is to input the reference voltage signal and to compare it with the initial output value of the SDM controller to produce an error signal which will be integrated by the integrator circuit 111, be proceeded through a high-frequency sampling-and-holding by the sample-and-hold circuit 112, and be quantized by the quantizer circuit 113 lastly. In general, a two-level comparator is employed as the two-level quantizer 113 to quantize the output (to modulate the output voltage signal) and to feedback to the input of the controller 11 so as to compare with the reference voltage signal again. Through this repetitive action, a series of pulse signals will be produced at the output terminal of the quantizer circuit 113, which is also the output terminal of the SDM controller 11, to drive the switch elements (Q1, Q2, Q3, Q4) of the power inversion circuit 13 to control the power outputs and the output waveforms. According to the feedback control theory, if the gain of the loop is large enough, the average value of the modulated output voltage signals will approach the average value of the reference voltage signals.

Referring to FIG. 2, the relationships between the SDM loop signals can be defined as follows:

$$v_{int}(t) = \frac{1}{R_{int}C_{int}} \int [v_r(t) - v_q(t)] dt \quad (19)$$

$$v_h(t) = \sum_{i=1}^{\infty} \sum_{j=0}^{N_t} v_{int}(jT_c)[u(t - t_{i,0} - jT_c) - u(t - t_{i,0} - (j+1)T_c)] \quad (20)$$

$$v_q(t) = V_q \mathrm{sgn}(v_h(t)) = \begin{cases} +V_{cc}, & v_h(t) \geq 0 \\ -V_{cc}, & v_h(t) < 0 \end{cases} \quad (21)$$

Considering that the reference voltage signal is a sinusoidal signal, the reference voltage signal is defined as follows:

$$v_r(t) = V_{rm} \sin \omega t \quad (22)$$

In which, the $V_{rm}$ is the peak value of the reference voltage signal, and $\omega$ is the angle frequency of the reference voltage signal. In order to avoid an over-modulated phenomenon which will cause a higher distortion problem, assume that $V_{rm} < V_{cc}$. Please refer to FIG. 3, when $t = t_{i,0}$ and $v_q(t_{i,0}) = -V_{cc}$, the relationships between the SDM loop signals can be defined as follows:

$$v_{int}(t_{i,1}) = \frac{1}{R_{int}C_{int}} \int_{t_{i,0}}^{t_{i,1}} [v_r(t) - v_q(t)] dt + v_{int}(t_{i,0}) \quad (23)$$

$$= \frac{1}{R_{int}C_{int}} \left[ -\frac{V_{rm}}{\omega} (\cos \omega t_{i,1} - \cos \omega t_{i,0}) + V_{cc}(t_{i,1} - t_{i,0}) \right] + v_{int}(t_{i,0})$$

$$v_h(t_{i,1}) = v_{int}(t_{i,1}) > 0 \quad (24)$$

$$v_q(t_{i,1}) = +V_{cc} \quad (25)$$

Since the modulated output voltage is subtracted from the reference input voltage and the result is a positive value, the slope of the integrated output of the integrator circuit 111 is positive. Considering that the sampling frequency is far greater than the reference voltage signal frequency, the reference voltage signal can be considered as a constant value during the sampling period. Assuming that $$m = \frac{V_r}{V_{cc}}$$

and $$K = \frac{1}{R_{int}C_{int}},$$

the integrated output slope of the integrator circuit 111 is $K(m+1)V_{cc}$. After sampling and holding, the result is larger than zero and the modulated output will be changed from $$-V_{cc} \to +V_{cc}.$$

$$v_{int}(t_{i,2}) = \frac{1}{R_{int}C_{int}} \int_{t_{i,1}}^{t_{i,2}} [v_r(t) - v_q(t)] dt + v_{int}(t_{i,1}) \quad (26)$$

$$= \frac{1}{R_{int}C_{int}} \left[ -\frac{V_{rm}}{\omega} (\cos \omega t_{i,2} - \cos \omega t_{i,1}) - V_{cc}(t_{i,2} - t_{i,1}) \right] + v_{int}(t_{i,1})$$

$$v_h(t_{i,2}) = v_{int}(t_{i,2}) > 0 \quad (27)$$

$$v_q(t_{i,2}) = +V_{cc} \quad (28)$$

Since the modulated output voltage is subtracted from the reference input voltage and the result is a negative value, the slope of the integrated output of the integrator circuit 111 is negative and will have a value of $K(m-1)V_{cc}$. After sampling and holding, the result is still greater than zero and the modulated output will be kept $+V_{cc}$. The motions of the SDM controller is as so, after n times of sampling and holding, the result is smaller than zero, and the modulated output is changed from $$-V_{cc} \to +V_{cc}$$

so as to finish a switching period.

Figure 3A:
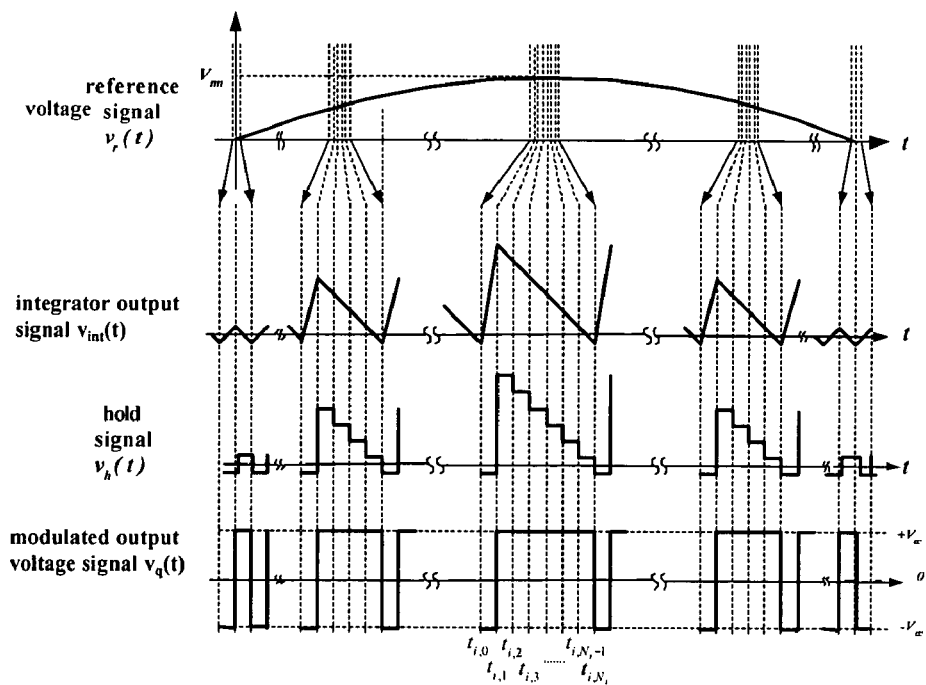
FIGS. 3(a) and 3(b) are the schematic diagrams showing the waveforms of the reference voltage signal, the output of the integrator circuit, the hold signal, and output of the SDM controller of the present invention when the reference voltage signals are in the positive-half period and in the negative-half period of a sinusoidal waveform respectively.
Figure 3B:
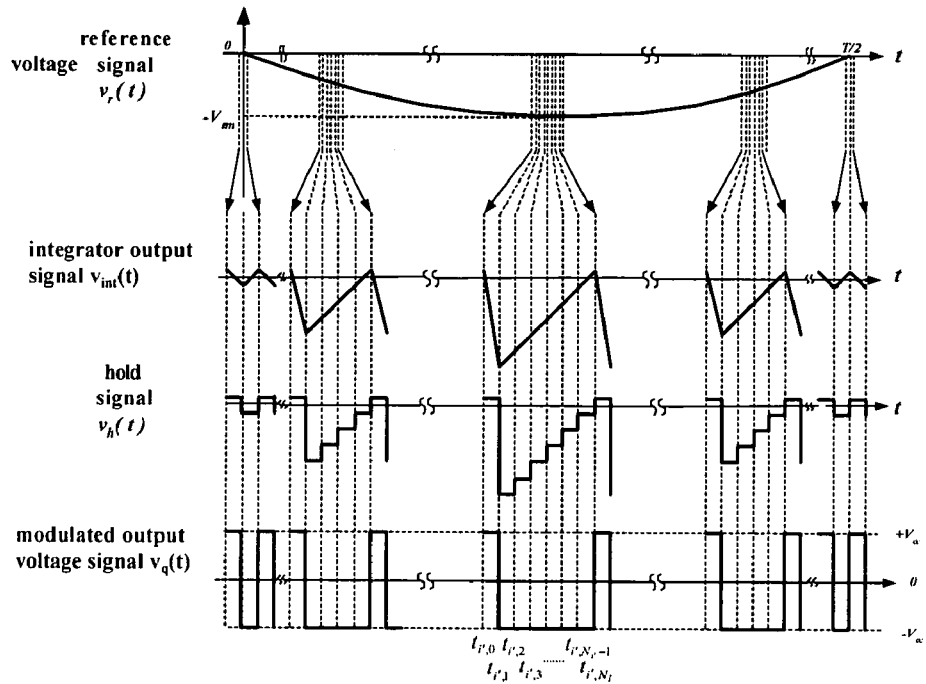

Please refer to FIGS. 3(*a*) and 3(*b*), which are the schematic diagrams showing the waveforms of the reference voltage signal, the output of the integrator circuit, the hold signal, and output of the SDM controller of the present invention when the reference voltage signals are in the positive-half period and in the negative-half period of a sinusoidal waveform respectively. Referring to FIG. 3, the duty cycle of the modulated voltage signal is increased as the reference voltage signal is increased. Assuming that the sampling frequency is far greater than the reference voltage signal frequency, the variations of reference voltage signal is quite small and can be considered as a constant value thus the increased variation amount and the decreased variation amount of the output of integrator circuit 111 during the period of sampling are the same, and:

$$K(m+1)V_{cc} = -nK(m-1)V_{cc} \quad (29)$$

From (29), we have:

$$n = \frac{1+m}{1-m} \quad (30)$$

If d is the duty cycle of the output modulated voltage signal, we get:

$$d = \frac{n}{1+n} = \frac{1+m}{2} \quad (31)$$

$$d(t) = \frac{1}{2} + \frac{v_r(t)}{2V_{cc}} \quad (32)$$

and 0<d(t)<1.

Figure 4:
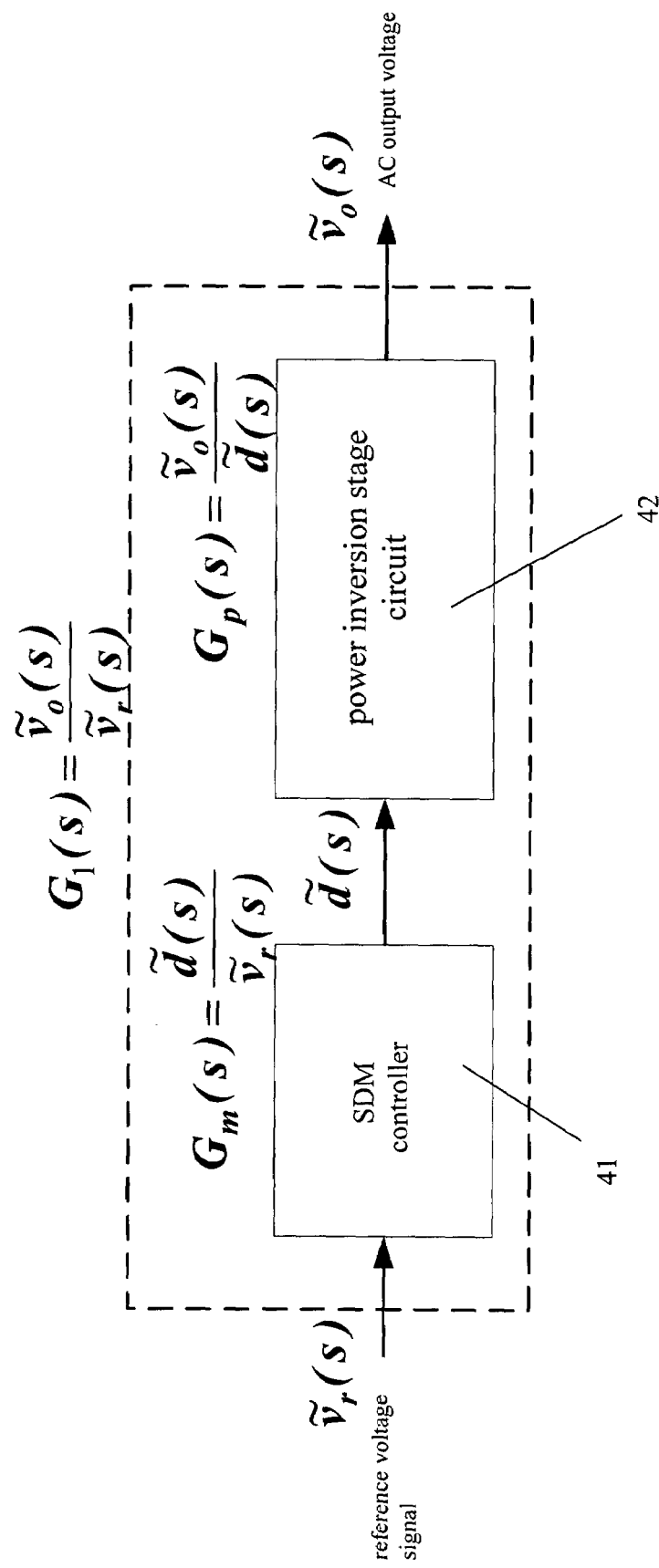
FIG. 4 is the block diagram of the open-looped SDM DC/AC inverter with full-bridge configuration of the present invention.

Please refer to FIG. 4, it is the block diagram of the open-looped SDM DC/AC inverter with full-bridge configuration of the present invention. Considering that the reference voltage signal of the SDM controller 41, $v_r(t)$, has a perturbation $\tilde{v}_r(t)$, we have:

$$v_r(t) = V_r + \tilde{v}_r(t) \quad (33)$$

Substitute (10) and (33) into (32), we get:

$$\tilde{d}(t) = \frac{\tilde{v}_r(t)}{2V_{cc}} \quad (34)$$

$$D = \frac{1}{2} + \frac{V_r}{2V_{cc}} \quad (35)$$

By taking the Laplace Transform of (34), the modulation transfer function $G_m(s)$ can be expressed as follows:

$$G_m(s) \equiv \frac{\tilde{d}(s)}{\tilde{v}_r(s)} = \frac{1}{2V_{cc}} \quad (36)$$

The power stage transfer function of the power inversion stage circuit 42, $G_p(s)$, is defined in (18). From (18) and (36), the transfer function of the modulated output voltage signal and the reference voltage signal, $G_1(s)$, can be expressed as follows:

$$G_1(s) \equiv \frac{\tilde{v}_o(s)}{\tilde{d}(s)} \frac{\tilde{d}(s)}{\tilde{v}_r(s)} = \frac{V_{dc}}{V_{cc}} \frac{\frac{1}{LC}}{s^2 + \frac{1}{RC}s + \frac{1}{LC}} \quad (37)$$

Results of Simulation and Measurement

Figure 5:
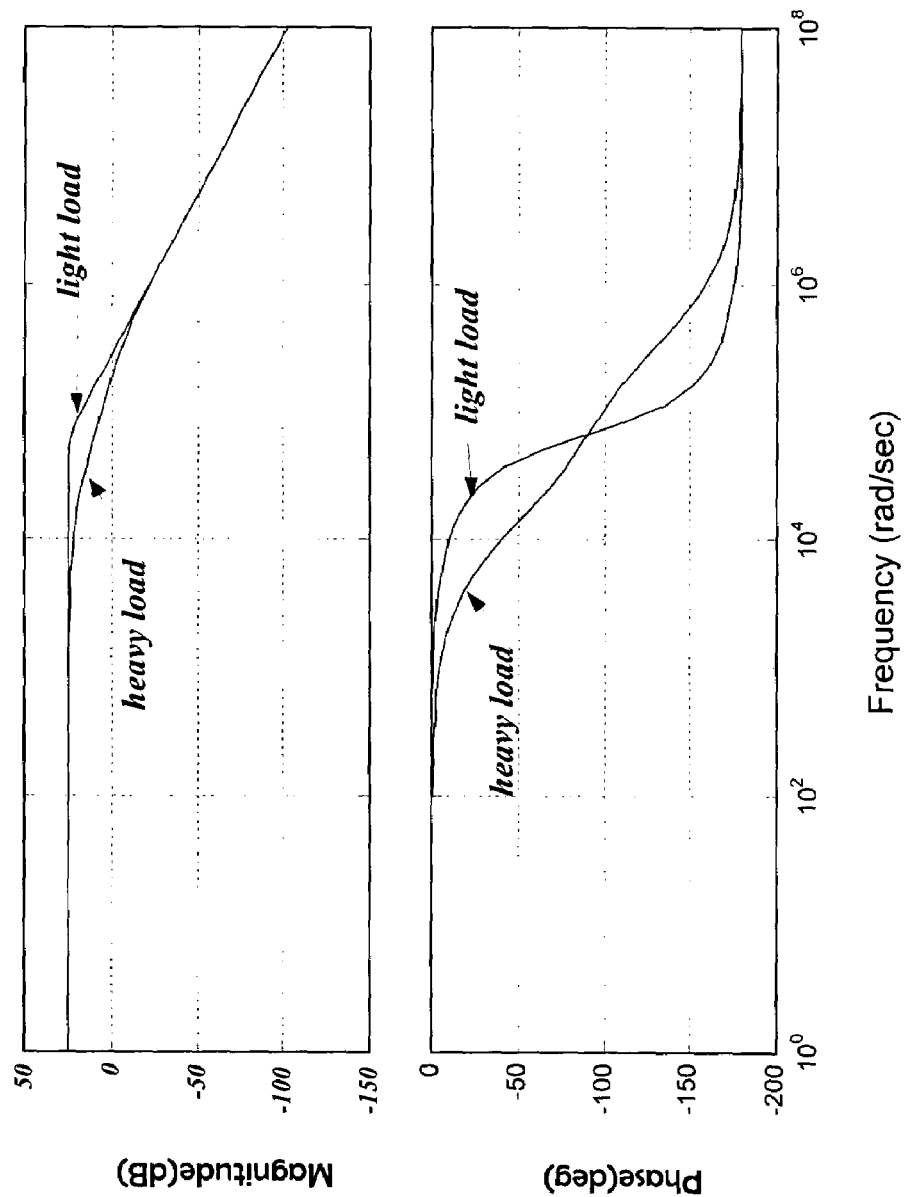
FIG. 5 is the schematic diagram showing the open-looped output-to-control frequency response for the SDM DC/AC inverter of the present invention.

A full-bridge configuration is employed in the DC/AC inverter of the present invention, a first-order SDM controller is used to modulate the high/low of the output voltage and the waveforms, and through the low-pass filter to filter the high-frequency harmonic waves so as to have a smooth voltage waveforms. According to the above-mentioned theory, the simulations and measurements of a 1 kVA DC/AC inverter circuit of the present invention have been accomplished. The DC input voltage is 200V, the AC output voltage is 110V, the capacitance of the output LC filter is C=0.22 μF, the inductance of the output LC filter is L=1 mH, the cutoff frequency of the output LC filter is 10.7 kHz. The open-loop output-to-control frequency responses for the provided SDM DC/AC inverter are simulated, and the results of simulation are shown in FIG. 5, in which the phase margin is 65° and the gain margin is 60 dB.

When the output power is 1 kVA, the desired output voltage is 110 Vrms, and the input frequencies are 1 kHz, 500 Hz, and 60 Hz respectively, the simulated waveforms using the Is Spice simulation software to simulate the sinusoidal and triangular waves and the measured output waveforms of the present invention are shown in FIG. 6(a1) to FIG. 8(b2), in which the power efficiency is up to 92% and the total harmonic distortion (THD) is less than 1.652%.

When the output power is 200 VA, the desired output voltage is 110 Vrms, and the input frequencies are 1 kHz, 500 Hz, and 60 Hz respectively, the simulated waveforms using the Is Spice simulation software to simulate the sinusoidal and triangular waves and the measured output waveforms of the present invention are shown in FIG. 9(a1) to FIG. 11(b2), in which the power efficiency is up to 83% and the total harmonic distortion (THD) is less than 1.733%. The measured output power, frequencies, output voltages, THDs, and the power efficiencies of the provided circuit of the present invention are shown in table 1.

TABLE 1

| Output power (VA) | Frequency (Hz) | $V_{o,rms}$ (V) | THD (%) | Power efficiency (%) |
|---|---|---|---|---|
| 200 | 60 | 110 | 1.078 | 88 |
|  | 500 | 110 | 1.488 | 85 |
|  | 1k | 110 | 1.733 | 83 |
| 1k | 60 | 110 | 0.998 | 94 |
|  | 500 | 110 | 1.066 | 93 |
|  | 1k | 110 | 1.652 | 92 |

In conclusion, the present invention applied the SDM technique to a DC/AC inverter, a SDM controller is used to modulate a reference voltage signal to a series of pulse signals, to amplify the signal power through a power inversion stage circuit, and to restore the signal waveforms through the filter circuit so as to simplify the circuitry configuration, to decrease the THD, and to output any kind of waveforms thus achieving the improvement of the drawbacks of the prior art.

Although the present invention has been described and illustrated in an example of the most preferred embodiment, the constructional characteristics of the present invention are not limited by that. The variations and modifications that anyone who is familiar with the skill can think of easily which fall within the spirit and scope of the present invention as defined by the appended claims should be included.

What is claimed is:

1. An inverter for converting a DC input voltage into an AC output voltage, the inverter comprising:
   (a) a sigma-delta modulation (SDM) controller for producing a modulated output voltage signal according to a reference voltage signal, wherein the SDM controller comprises:
      (i) an integrator for producing an integrator output signal having an integrated output slope according to a difference between the reference voltage signal and the modulated output voltage signal;
      (ii) a sample-and-hold circuit electrically connected to the integrator for sampling and holding the integrator output signal; and (iii) a quantizer circuit electrically connected to the sample-and-hold circuit and to an input terminal of the integrator through an output terminal thereof for quantizing the integrator output signal and producing the modulated output voltage signal;

(b) a driving circuit electrically connected to the SDM controller for producing a driving signal according to the modulated output voltage signal; and (c) a power inversion stage circuit electrically connected to the driving circuit for producing the AC output voltage according to the driving signal.

2. The inverter according to claim 1, wherein the integrated output slope is positive when the difference between the reference voltage signal and the modulated output voltage signal is a positive value.

3. The inverter according to claim 1, wherein the integrator is a differential integrator.

4. The inverter according to claim 1, wherein the sample-and-hold circuit is a sample-and-hold device and is controlled by an external sampling signal.

5. The inverter according to claim 1, wherein the quantizer circuit is a two-level quantizer.

6. The inverter according to claim 5, wherein the two-level quantizer is a two-level comparator.

7. The inverter according to claim 1, wherein the modulated output voltage signal is a pulse train.

8. The inverter according to claim 1, wherein the reference voltage signal is input from an external signal generator.

9. The inverter according to claim 1, wherein the driving circuit is a high/low side driver.

10. The inverter according to claim 1, wherein the power inversion stage circuit comprises:
a power stage circuit electrically connected to the driving circuit for producing a AC power signal according to the driving signal and the DC input voltage; and
a filter circuit electrically connected to the power stage circuit for producing the AC output voltage according to the AC power signal.

11. The inverter according to claim 10, wherein the power stage circuit is in a full-bridge configuration.

12. The inverter according to claim 11, wherein the full-bridge configuration is an H-diagonal structure comprising four power switches.

13. The inverter according to claim 12, wherein each of the four power switches is a MOSFET.

14. The inverter according to claim 10, wherein the filter circuit is a low-pass filter.

15. The inverter according to claim 10, wherein the filter circuit comprises an inductor and a capacitor in series.

16. A controller for producing a modulated output voltage signal according to a reference voltage signal, the controller comprising:
(a) an integrator for producing an integrator output signal having an integrated output slope according to a difference between the reference voltage signal and the modulated output voltage signal;
(b) a sample-and-hold circuit electrically connected to the integrator for sampling and holding the integrator output signal; and
(c) a quantizer circuit electrically connected to the sample-and-hold circuit and electrically connected to an input terminal of the integrator through an output terminal thereof for quantizing the integrator output signal and producing the modulated output voltage signal.

17. The controller according to claim 16, wherein the integrated output slope is positive when the difference between the reference voltage signal and the modulated output voltage signal is a positive value.

18. The controller according to claim 16, wherein the integrator is a differential integrator.

19. The controller according to claim 16, wherein the sample-and-hold circuit is a sample-and-hold device and is controlled by an external sampling signal.

20. The controller according to claim 16, wherein the quantizer circuit is a two-level quantizer.

21. The controller according to claim 20, wherein the two-level quantizer is a two-level comparator.

22. The controller according to claim 16, wherein the modulated output voltage signal is a pulse train.

23. The controller according to claim 16, wherein the reference voltage signal is input from an external signal generator.

24. The controller according to claim 16, wherein the controller is a sigma-delta modulation (SDM) controller.

25. The controller according to claim 16, wherein the integrated output slope is negative when the difference between the reference voltage signal and the modulated output voltage signal is a negative value.

26. The inverter according to claim 1, wherein the integrated output slope is negative when the difference between the reference voltage signal and the modulated output voltage signal is a negative value.

27. In an inverter for converting a DC input voltage into an AC output voltage, a sigma-delta modulation (SDM) controller for producing a modulated output voltage signal according to a reference voltage signal, the SDM controller comprising:
(a) an integrator for producing an integrator output signal having an integrated output slope according to a difference between the reference voltage signal and the modulated output voltage signal;
(b) a sample-and-hold circuit electrically connected to the integrator for sampling and holding the integrator output signal; and
(c) a quantizer circuit electrically connected to the sample-and-hold circuit and to an input terminal of the integrator through an output terminal thereof for quantizing the integrator output signal and producing the modulated output voltage signal.

* * * * *